United States Patent
Naito et al.

(10) Patent No.: US 10,930,964 B2
(45) Date of Patent: Feb. 23, 2021

(54) FUEL CELL STACK

(71) Applicant: HONDA MOTOR CO., LTD., Tokyo (JP)

(72) Inventors: Hideharu Naito, Utsunomiya (JP); Yusuke Nara, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 9 days.

(21) Appl. No.: 15/384,112

(22) Filed: Dec. 19, 2016

(65) Prior Publication Data

US 2017/0187061 A1 Jun. 29, 2017

(30) Foreign Application Priority Data

Dec. 25, 2015 (JP) ................. 2015-254955

(51) Int. Cl.
*H01M 8/2475* (2016.01)

(52) U.S. Cl.
CPC ...... *H01M 8/2475* (2013.01); *H01M 2250/20* (2013.01); *Y02T 90/40* (2013.01)

(58) Field of Classification Search
CPC .... H01M 8/247; H01M 8/2475; H01M 8/248; H01M 2250/20; H01M 8/24; H01M 8/2465; Y02T 90/32; Y02T 90/40; Y02E 60/50
USPC .......................................... 429/469
See application file for complete search history.

(56) References Cited

U.S. PATENT DOCUMENTS

| | | | |
|---|---|---|---|
| 5,514,486 A | 5/1996 | Wilson | |
| 10,236,529 B2* | 3/2019 | Naito | H01M 8/248 |
| 2009/0092873 A1* | 4/2009 | Jeong | H01M 8/248 429/460 |
| 2013/0202983 A1* | 8/2013 | Nishiyama | H01M 8/248 429/465 |
| 2014/0127599 A1* | 5/2014 | Kachi | H01M 8/004 429/434 |
| 2017/0237107 A1* | 8/2017 | Naito | H01M 8/248 429/469 |

FOREIGN PATENT DOCUMENTS

| | | | |
|---|---|---|---|
| CN | 101867055 A | | 10/2010 |
| CN | 103199296 A | | 7/2013 |
| JP | 01-320777 | * | 12/1989 |
| JP | H06-14622 U | | 2/1994 |
| JP | 2001-006715 A | | 1/2001 |
| JP | 2004-158449 A | | 6/2004 |
| JP | 2008-002655 A | | 1/2008 |
| JP | 2009-252703 | * | 10/2009 |
| JP | 2013-152830 A | | 8/2013 |
| JP | 2013-152878 A | | 8/2013 |
| JP | 2013-179032 A | | 9/2013 |
| JP | 2014-216269 A | | 11/2014 |
| JP | 2015-191841 A | | 11/2015 |

OTHER PUBLICATIONS

Machine translation of JP 01-320777, published on Dec. 26, 1989 (Year: 1989).*
Bolted Joints (Part 1)—Shear, Apollo Edge, Sep. 27, 2016 (Year: 2016).*
Machine translation of the abstract of JP 2009-252703, published on Oct. 29, 2009 (Year: 2009).*
Machine translation of the description of JP 2009-252703, published on Oct. 29, 2009 (Year: 2009).*
Office Action, Notice of Allowance, issued in the corresponding Japanese Patent Application No. 2015-254955, with the English translation thereof and dated Nov. 13, 2018.
Office Action issued in corresponding Chinese Patent Application No. 201611190888.5, with a partial English translation of the Search Report, dated Dec. 21, 2018.

* cited by examiner

*Primary Examiner* — Anca Eoff
(74) *Attorney, Agent, or Firm* — Carrier Blackman & Associates, P.C.; Joseph P. Carrier; Jeffrey T. Gedeon (57) ABSTRACT

A fuel cell stack includes a pair of end plates disposed on opposing sides of a fuel cell stacked body in a first direction, a coupling bar that bridges between the end plates, a fastening member that connects the end plates and the coupling bar in the first direction, and a cylindrical knock disposed inside an end plate side mounting hole and a coupling bar side mounting hole of the end plates and the coupling bar in the first direction, and being externally fitted to the fastening member inside the end plate side mounting hole and the coupling bar side mounting hole. A first seal member in close contact with at least an inner circumferential surface of the end plate side mounting hole and the fastening member is disposed in a portion located between the cylindrical knock and the fastening member inside the end plate side mounting hole.

4 Claims, 8 Drawing Sheets

FUEL CELL STACK

CROSS-REFERENCE TO RELATED APPLICATION

Priority is claimed on Japanese Patent Application No. 2015-254955, filed Dec. 25, 2015, the content of which is incorporated herein by reference.

BACKGROUND OF THE INVENTION

Field of the Invention

The present invention relates to a fuel cell stack.

Description of Related Art

A fuel cell stack mounted on a vehicle or the like has a fuel cell stacked body (hereinafter, simply referred to as a "stacked body") and a casing configured to house the stacked body (e.g., refer to Japanese Unexamined Patent Application, First Publication No. 2014-216269).

The stacked body is made up of a plurality of unit cells which are stacked. The unit cell includes a membrane-electrode assembly (hereinafter, simply referred to as MEA) having a configuration in which a solid polymer electrolyte membrane is interposed between an anode electrode and a cathode electrode on both sides, and separators which sandwich the MEA.

A casing has a pair of end plates that sandwich the stacked body from both sides in a stacking direction, a coupling bar that bridges fasten the pair of end plates, and a side panel that surrounds the periphery of the stacked body from a direction intersecting with the stacking direction.

The end plates and the coupling bar are fastened to each other by a fastening member inserted into an end plate side mounting hole and a coupling bar side mounting hole, while butting against each other in the stacking direction of the stacked body. For example, Japanese Unexamined Patent Application, First Publication No. 2013-179032 discloses a configuration in which a cylindrical knock is disposed in the end plate side mounting hole and the coupling bar side mounting hole. The cylindrical knock is disposed to bridge fasten the end plate side mounting hole and the coupling bar side mounting hole, and is externally fitted to the fastening member.

In the aforementioned fuel cell stack, hydrogen gas is supplied to the anode electrode as fuel gas, and air is supplied to the cathode electrode as oxidant gas. Therefore, a hydrogen ion generated in the anode electrode by a catalytic reaction is transmitted through the solid polymer electrolyte membrane and moves to the cathode electrode. In the cathode electrode, the hydrogen ion causes an electrochemical reaction with oxygen in air, and thus, power generation is performed.

SUMMARY OF THE INVENTION

Incidentally, in the conventional fuel cell stack, there is a case where a reaction gas (fuel gas or oxidant gas) flowing through the stacked body leaks outside the stacked body through a gap or the like between the respective unit cells. In this case, for example, the reaction gas leaking outside the stacked body may leak outside the casing through the end plate side mounting hole and the coupling bar side mounting hole. In particular, because molecules of the hydrogen gas used as fuel gas is small, the aforementioned problem becomes significant.

When water present outside the casing enters the end plate side mounting hole or the coupling bar side mounting hole, there is a risk of corrosion of the cylindrical knock or the like.

Accordingly, aspects of the invention have been made in consideration of the above-described circumstances, and an object thereof is to provide a fuel cell stack in which leaking of the reaction gas outside the casing is able to be suppressed and in which entry of water from outside the casing is able to be suppressed.

(1) To achieve the aforementioned object, according to an aspect of the invention, a fuel cell stack includes a fuel cell stacked body in which a plurality of fuel cells are stacked in a first direction; a casing that houses the fuel cell stacked body; a pair of end plates that constitute a part of the casing and are disposed on opposing sides of the fuel cell stacked body in the first direction; a coupling bar that bridges fasten the pair of end plates; a fastening member that connects the end plates and the coupling bar in the first direction; and a cylindrical knock that is disposed inside an end plate side mounting hole and a coupling bar side mounting hole to which the fastening member is inserted in the first direction, and is externally fitted to the fastening member inside the end plate side mounting hole and the coupling bar side mounting hole, wherein a first seal member which is in close contact with at least an inner circumferential surface of the end plate side mounting hole and the fastening member is disposed in a portion located between the cylindrical knock and the fastening member in the first direction inside the end plate side mounting hole.

(2) According to another aspect of the invention, a fuel cell stack includes a fuel cell stacked body in which a plurality of fuel cells are stacked in a first direction; a casing that houses the fuel cell stacked body; a pair of end plates that constitute a part of the casing and are disposed on opposing sides of the fuel cell stacked body in the first direction; a coupling bar that bridges fasten the pair of end plates; a fastening member that connects the end plates and the coupling bar in the first direction; a cylindrical knock that is disposed inside an end plate side mounting hole and a coupling bar side mounting hole to which the fastening member is inserted in the first direction, and is externally fitted to the fastening member inside the end plate side mounting hole and the coupling bar side mounting hole; a second seal member that is externally fitted to the cylindrical knock inside the end plate side mounting hole, and is in close contact with the inner circumferential surface of the end plate side mounting hole and the cylindrical knock; and a third seal member that is externally fitted to the cylindrical knock inside the bar side mounting hole, and is in close contact with the inner circumferential surface of the coupling bar side mounting hole and the cylindrical knock.

According to the above aspect (1), discharge of the reaction gas leaking from the stacked body and present in the casing outside of the fuel cell stack through the respective mounting holes is able to be suppressed.

In particular, the first seal member is configured to be in close contact with at least the inner circumferential surface of the end plate side mounting hole and the fastening member, in the portion located between the cylindrical knock and the fastening member in the first direction inside the end plate side mounting hole. Therefore, the single first seal member can block the reaction gas from flowing through the outer circumferential side and the inner circumferential side of the cylindrical knock. Thus, it is possible to promote simplification and to reliably prevent the reaction gas from leaking to the outside.

The first seal member can block water present outside the casing from entering the casing through the end plate side mounting hole. In this case, because it is possible to block water on the end plate side from the boundary portion between the end plate and the coupling bar, it is possible to suppress the corrosion of the portion (hereinafter, referred to as a shear portion) corresponding to the boundary portion between the end plate and the coupling bar, especially in the cylindrical knock.

According to the aspect (2), discharge of the reaction gas leaking from the stacked body and present in the casing outside of the fuel cell stack through the respective mounting holes is able to be suppressed.

In particular, because the second seal member is in close contact with the inner circumferential surface of the end plate side mounting hole and the cylindrical knock, it is possible to suppress the reaction gas which has entered the mounting hole from leaking to the outside of the fuel cell stack through the outer circumferential side of the cylindrical knock.

The second seal member can block water present outside the casing from entering the casing through the end plate side mounting hole. In this case, because it is possible to block water on the end plate side from the boundary portion between the end plate and the coupling bar, in particular, it is possible to suppress the corrosion of the shear portion of the cylindrical knock.

Because the third seal member is in close contact with the inner circumferential surface of the coupling bar side mounting hole and the cylindrical knock, the reaction gas which has entered the mounting hole passing around the stacked body of the cylindrical knock in the first direction and entering the inner circumferential side of the cylindrical knock is able to be suppressed.

DETAILED DESCRIPTION OF THE INVENTION

Next, an embodiment of the invention will be described with reference to the accompanying drawings.

First Embodiment

[Fuel Cell Stack]

Figure 1:
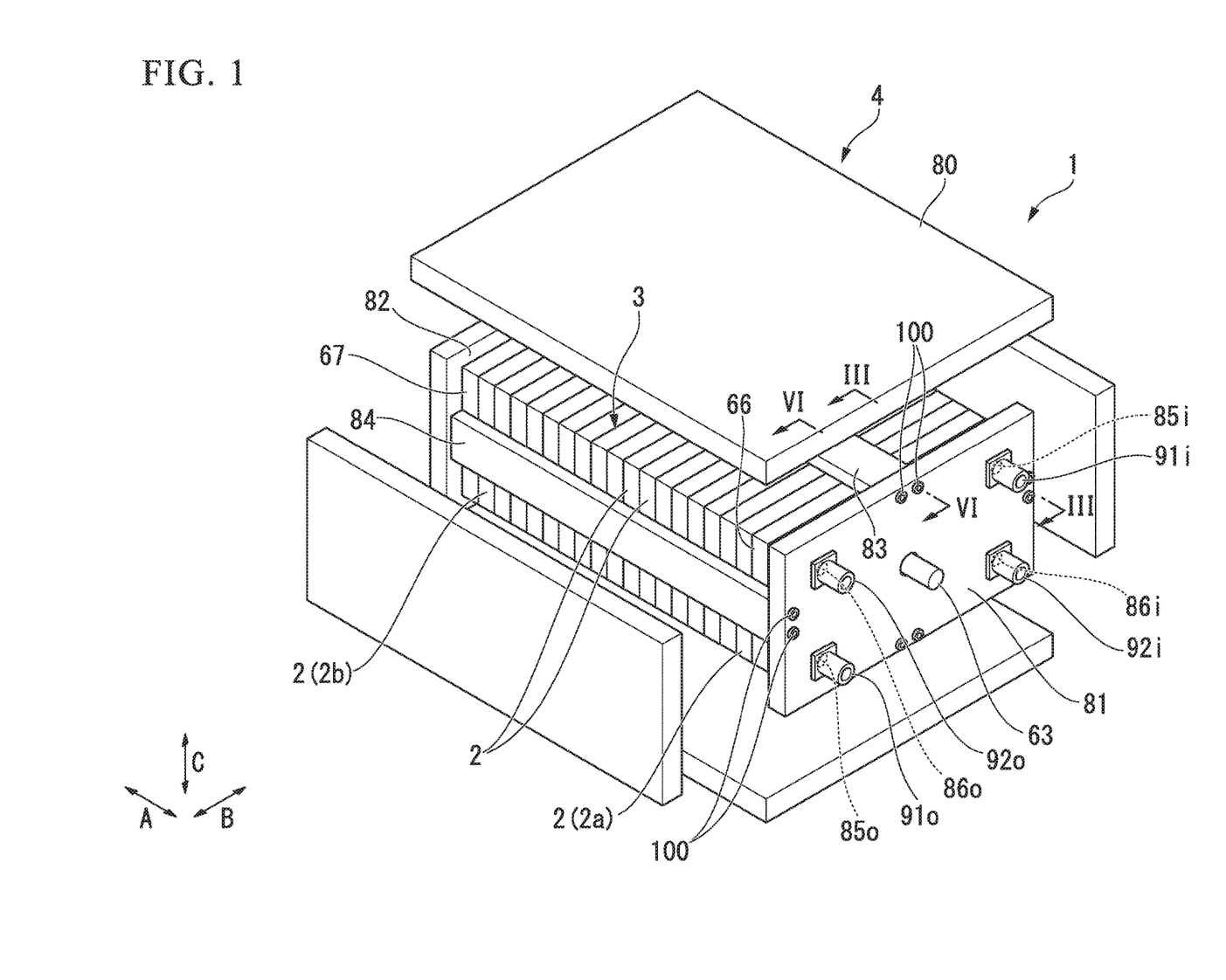
FIG. 1 is an exploded perspective view of a fuel cell stack of a first embodiment which is seen from a first end plate side.

FIG. 1 is an exploded perspective view of a fuel cell stack 1 of this embodiment which is seen from a first end plate 81 side.

As shown in FIG. 1, the fuel cell stack 1 of this embodiment is mounted in a motor room that is partitioned at the front of a vehicle (not illustrated), or under a floor of the vehicle. The fuel cell stack 1 is used, for example, to supply power to a driving motor. The fuel cell stack 1 of the present embodiment is mounted on the vehicle such that, for example, a direction A (a first direction) of FIG. 1 is set as a width direction of the vehicle, a direction B (a second direction) is set as a front-rear direction of the vehicle and a direction C (a second direction) of the vehicle is set as a vertical direction.

The fuel cell stack 1 is mainly provided with a stacked body (a fuel cell stacked body) 3, and a casing 4 that houses the stacked body 3.

The stacked body 3 has a configuration in which a plurality of unit cells (fuel cells) 2 are stacked in the direction A (a stacking direction). In the following description, for the above-mentioned the direction A, the direction B, and the direction C (gravity direction), in some cases, the direction of approach to the central portion of the stacked body 3 is referred to as inside, and the direction moving away from the central portion of the stacked body 3 is referred to as outside.

<Unit Cell>

Figure 2:
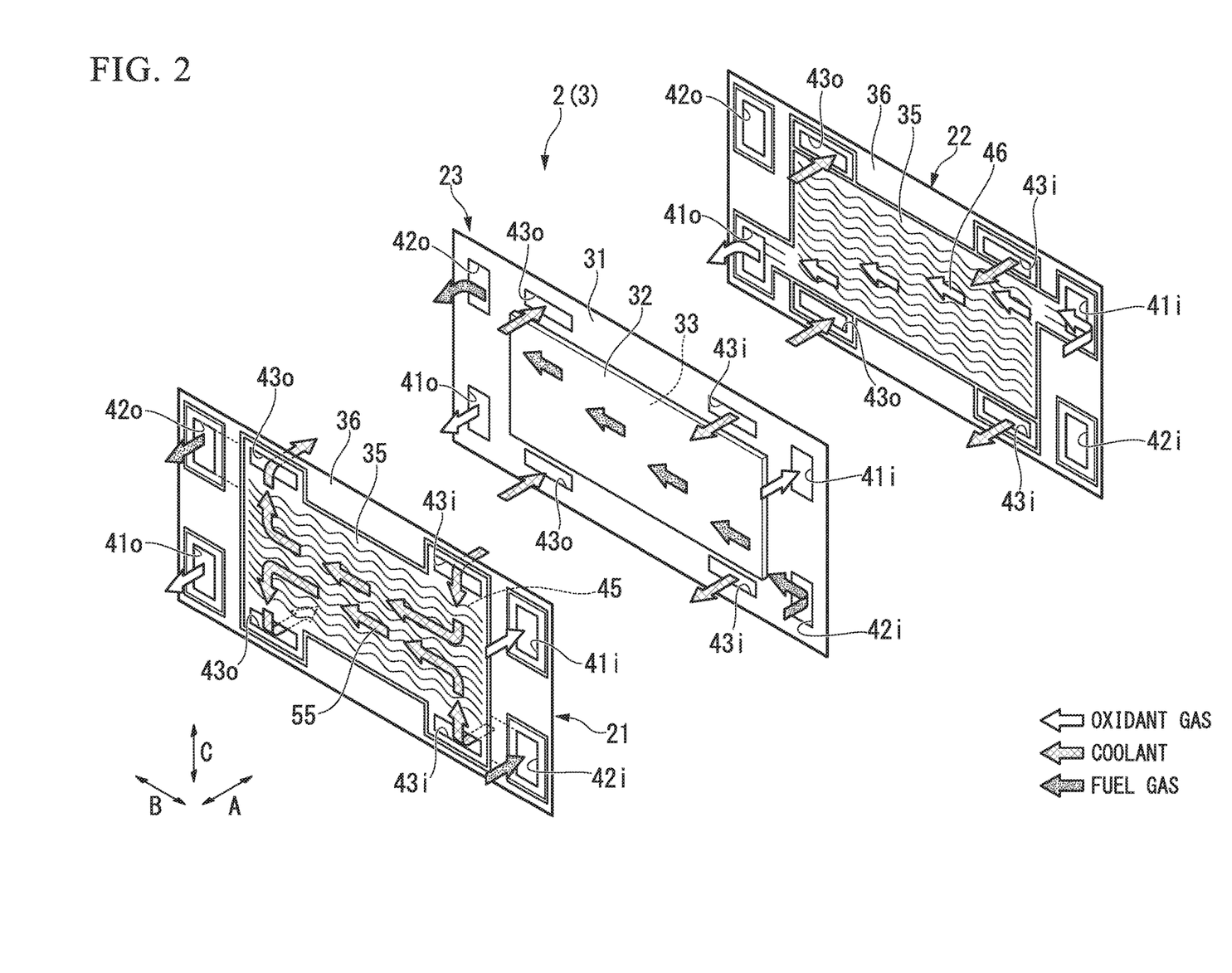
FIG. 2 is an exploded perspective view of a unit cell shown in FIG. 1.

FIG. 2 is an exploded perspective view of the unit cell 2.

As shown in FIG. 2, the unit cell 2, for example, is equipped with a pair of separators 21 and 22, and a membrane electrode assembly 23 (hereinafter, simply referred to as MEA 23) sandwiched between the separators 21 and 22. The MEA 23 is equipped with a solid polymer electrolyte membrane 31, and an anode electrode 32 and a cathode electrode 33 that sandwich the solid polymer electrolyte membrane 31 from both sides in the direction A.

The anode electrode 32 and the cathode electrode 33 have a gas diffusion layer made up of a carbon paper or the like, and an electrode catalyst layer that is formed by uniformly applying porous carbon particles with a platinum alloy held on the surface to the surface of the gas diffusion layer.

The solid polymer electrolyte membrane 31, for example, is formed of a material in which perfluorosulfonic acid polymer is impregnated with water. The solid polymer electrolyte membrane 31 has an external shape in a front view as seen in the direction A that is larger than the anode electrode 32 and cathode electrode 33. In the example of FIG. 2, the anode electrode 32 and the cathode electrode 33 stack each other in the central portion of the solid polymer electrolyte membrane 31. The outer circumferential portion of the solid polymer electrolyte membrane 31 protrudes from the anode electrode 32 and the cathode electrode 33 in a frame shape.

The separators 21 and 22 of the unit cell 2 are each of a first separator 21 that faces the anode electrode 32 of the MEA 23, and a second separator 22 that faces the cathode electrode 33 of the MEA 23. In the following description, in each of the separators 21 and 22, the same configurations will be collectively described by being denoted by the same reference numerals.

Each of the separators 21 and 22 has a separator plate 35, and a covering member 36 that covers the outer circumferential portion of the separator plate 35.

The separator plate 35 is made up of a rectangular metal plate having the direction B set as a longitudinal direction or a carbon plate. In the example of FIG. 2, the separator plate 35 has an external shape in the front view that is similar to that of the solid polymer electrolyte membrane 31. The separator plate 35 stacks (overlaps) the MEA 23 when viewed in the direction A.

Figure 3:
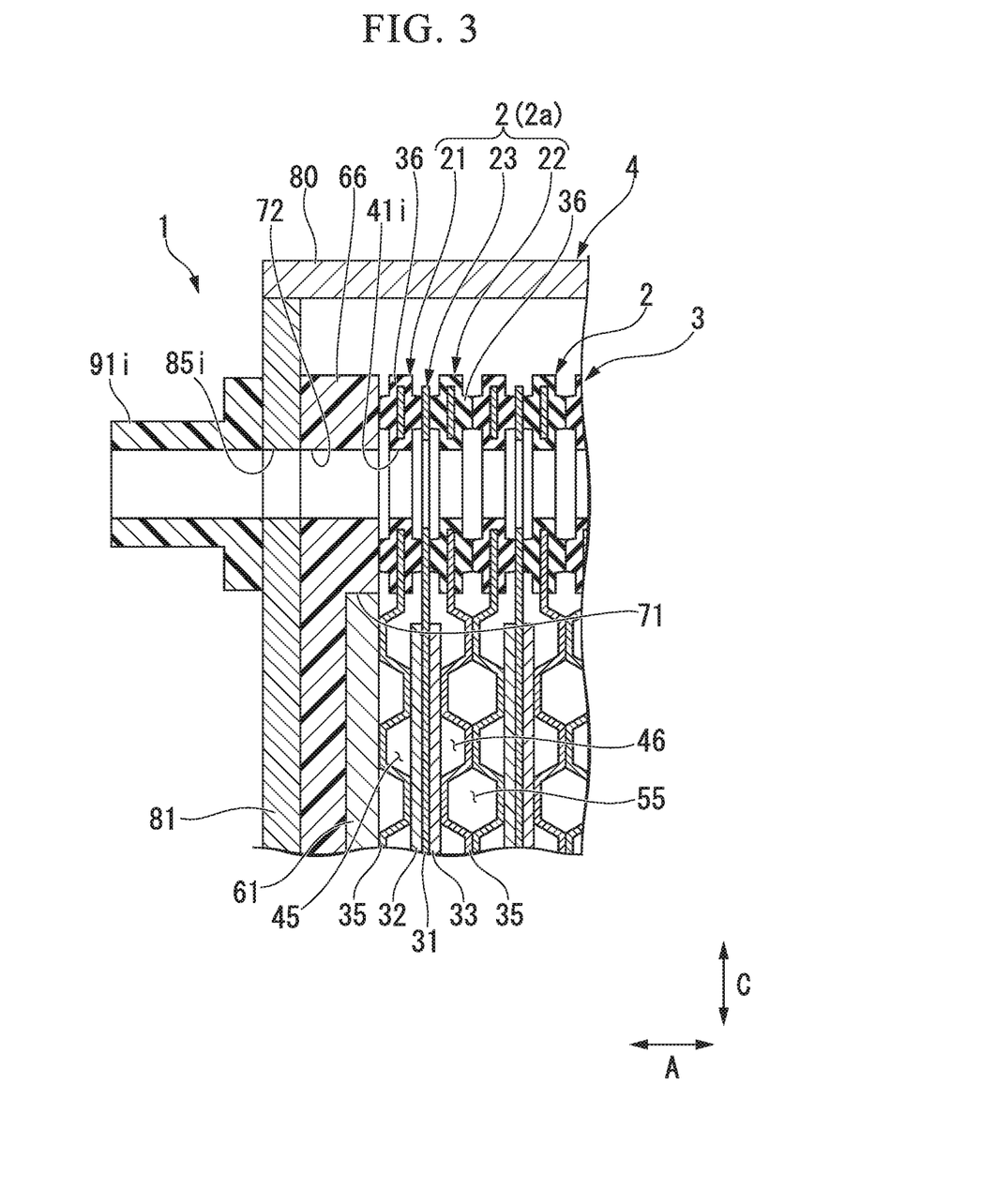
FIG. 3 is a cross-sectional view corresponding to line of FIG. 1.

FIG. 3 is a cross-sectional view corresponding to line of FIG. 1.

As shown in FIG. 3, the covering member 36 is formed from an elastically deformable material (e.g., rubber or the like). The covering member 36 is in close contact with the outer circumferential portion of the solid polymer electrolyte membrane 31 in the direction A.

As shown in FIG. 2, in each corner portion of the unit cell 2 (the solid polymer electrolyte membrane 31 and each of the separators 21 and 22), inlet side gas communication holes (an oxidant gas inlet communication hole 41$i$ and a fuel gas inlet communication hole 42$i$), and outlet side gas communication holes (an oxidant gas outlet communication hole 41$o$ and a fuel gas outlet communication hole 42$o$) are formed. Each of the communication holes 41$i$, 41$o$, 42$i$ and 42$o$ passes through the unit cell 2 in the direction A. In the example shown in FIG. 2, an oxidant gas inlet communication hole 41$i$ is formed in the right upper corner portion of the unit cell 2. The oxidant gas (e.g., air or the like) supplied to the cathode electrode 33 flows through the oxidant gas inlet communication hole 41$i$. A fuel gas inlet communication hole 42$i$ is formed in a right lower corner portion of the unit cell 2. The fuel gas (e.g., hydrogen or the like) supplied to the anode electrode 32 flows through the fuel gas inlet communication hole 42$i$. An oxidant gas outlet communication hole 41$o$ is formed in a left lower corner portion of the unit cell 2. The consumed oxidant gas passed through the cathode electrode 33 flows through the oxidant gas outlet communication hole 41$o$. The fuel gas outlet communication hole 42$o$ is formed in the left upper corner portion of the unit cell 2. The consumed fuel gas passed through the anode electrode 32 passes through the fuel gas outlet communication hole 42$o$.

In the unit cell 2, in the portions located on the inside of the respective inlet communication holes 41$i$ and 42$i$ in the direction B, coolant inlet communication holes 43$i$ are formed.

In the unit cell 2, in the portions located on the inside of the respective outlet communication holes 41$o$ and 42$o$ in the direction B, coolant outlet communication holes 43$o$ are formed. A pair of coolant inlet communication holes 43$i$ and a pair of coolant outlet communication holes 43$o$ are disposed at positions facing each other in the direction C, while the anode electrode 32 and the cathode being interposed electrode 33 therebetween.

The central portions of each of the separators 21 and 22 (the separator plate 35) have a concave-convex shape due to press forming or the like. Gas flow passages 45 and 46 (indicated by arrows in FIG. 2) are formed between the surfaces of the separators 21 and 22 facing the MEA 23, and the MEA 23.

Specifically, the fuel gas flow passage 45 is formed between the surface of the first separator 21 facing the anode electrode 32 and the anode electrode 32 of the MEA 23. The fuel gas flow passage 45 communicates with each of the fuel gas inlet communication hole 42$i$ and the fuel gas outlet communication hole 42$o$.

An oxidant gas flow passage 46 is formed between the surface of the second separator 22 facing the cathode electrode 33 and the cathode electrode 33 of the MEA 23. The oxidant gas flow passage 46 is in communication with each of the oxidant gas inlet communication hole 41$i$ and the oxidant gas outlet communication hole 41$o$.

As shown in FIG. 3, the stacked body 3 is configured so that the first separator 21 of one unit cell 2 and the second separator 22 of another unit cell 2 adjacent to the one unit cell 2 are stacked in the direction A in an stacking (overlapping) state. Further, a coolant flow passage 55 is formed between the first separator 21 of the one unit cell 2 and the second separator 22 of the other unit cell 2. As shown in FIG. 2, the coolant flow passage 55 communicates with each of the coolant inlet communication holes 43$i$ and the coolant outlet communication holes 43$o$. As the coolant flowing through the coolant flow passage 55, for example, pure water, ethylene glycol or the like is preferably used.

The stacked structure of the unit cells 2 is not limited to the above-described configuration. For example, the unit cell may be made up of three separators and two MEAs interposed between the respective separators. It is also possible to appropriately change the design of the layout of the communication holes.

Figure 4:
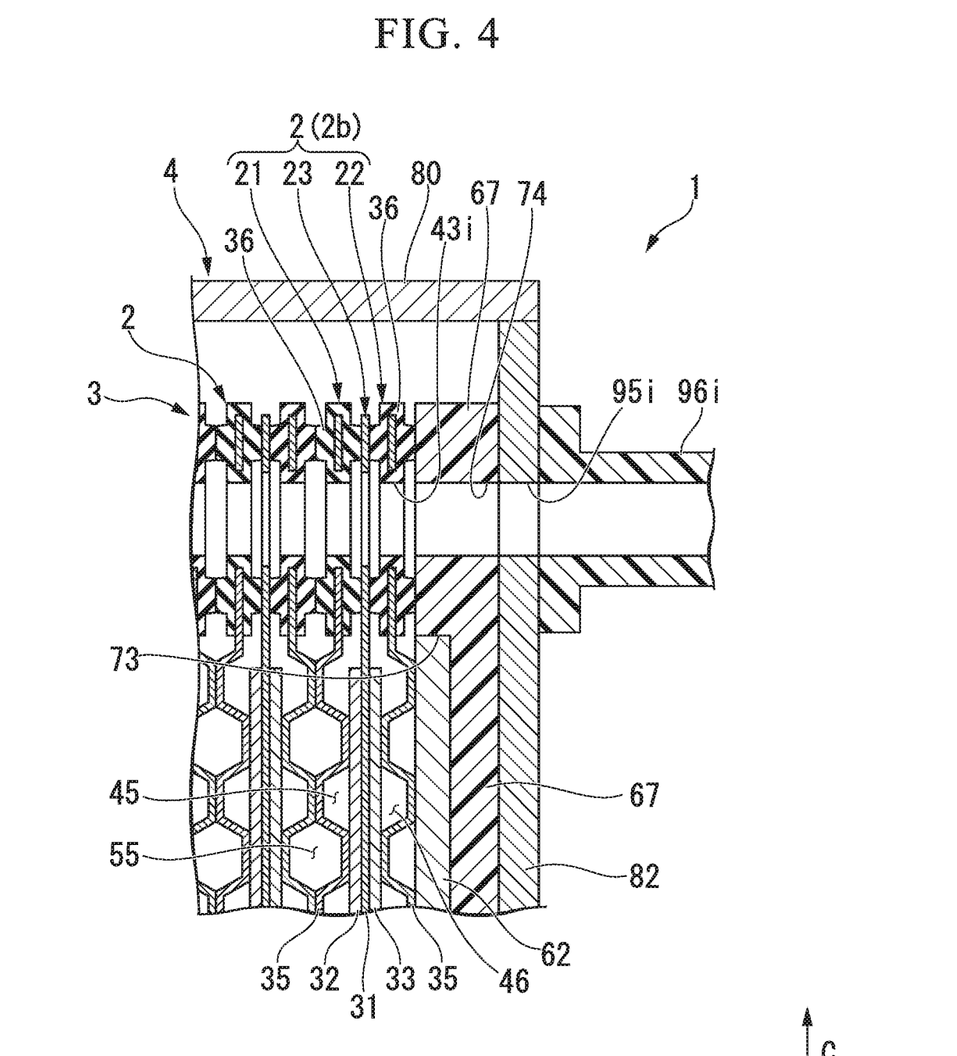
FIG. 4 is a cross-sectional view corresponding to line IV-IV of FIG. 5.

FIG. 4 is a cross-sectional view corresponding to line IV-IV of FIG. 5.

As shown in FIGS. 3 and 4, on both sides of the stacked body 3 in the direction A, terminal plates (a first terminal plate 61 and a second terminal plate 62) are disposed. The external shape in the front view of each of the terminal plates 61 and 62 is smaller than the separators 21 and 22. As shown in FIG. 3, the first terminal plate 61 is electrically connected to the anode electrode 32 of the unit cell (hereinafter, referred to as a first end cell 2$a$) located at the first end in the direction A of the stacked body 3 (each unit cell 2) via the first separator 21. As shown in FIG. 1, the first terminal plate 61 is formed to have an output terminal 63 (see FIG. 1) which protrudes outside in the direction A.

A first insulator 66 is disposed outside the first terminal plate 61 in the direction A. An external shape in the front view of the first insulator 66 is larger than the first terminal plate 61. The thickness of the first insulator 66 in the direction A is thicker than the first terminal plate 61.

A housing portion 71 recessed outside in the direction A is formed in the central portion of the first insulator 66. The aforementioned first terminal plate 61 is housed inside the housing portion 71.

The outer circumferential portion (a portion located outside the housing portion 71) of the first insulator 66 is in close contact with the first separator 21 (the covering member 36) of the first end cell 2$a$ from the outside in the direction A. An oxidant gas inlet connection hole 72 and a fuel gas inlet connection hole (not shown) communicating with each of the gas inlet communication holes 41$i$ and 42$i$ are formed on the outer circumferential portion of the first insulator 66. In the outer circumferential portion of the first insulator 66, an oxidant gas outlet connection hole (not shown) communicating with the oxidant gas outlet communication hole 41$o$, and a fuel gas outlet connection hole communicating with the fuel gas outlet communication hole 42$o$ are formed.

As shown in FIG. 4, the second terminal plate 62 is electrically connected to the cathode electrode 33 of the unit cell (hereinafter, referred to as a second end cell 2$b$) located at the second end in the direction A among the respective unit cells 2 via the second separator 22. The second terminal plate 62 is formed to have an output terminal 64 (see FIG. 5) which protrudes outside in the direction A.

The second insulator 67 is disposed outside the second terminal plate 62 in the direction A. An external shape in the front view of the second insulator 67 is larger than the second terminal plate 62. The thickness of the second insulator 67 in the direction A is thicker than the second terminal plate 62.

A housing portion 73 recessed outside in the direction A is formed in the central portion of the second insulator 67. The aforementioned second terminal plate 62 is housed inside the housing 73.

The outer circumferential portion (a portion located outside the housing portion 73) of the second insulator 67 is in close contact with the second separator 22 (the covering member 36) of the second end cells 2b from the outside in the direction A. In the outer circumferential portion of the second insulator 67, a coolant inlet connection hole 74 communicating with each of the coolant inlet communication holes 43i and a coolant outlet connection hole (not shown) communicating with each of the coolant outlet communication holes 43o are formed.

<Casing>

As shown in FIG. 1, the casing 4 is formed in a box shape having a size larger than the stacked body 3. The stacked body 3 is housed inside the casing 4. Specifically, the casing 4 is provided with four side panels 80, a pair of end plates (a first end plate 81 and a second end plate 82), and coupling bars (a pair of a first coupling bar 83 and a second coupling bar 84 each provided on two opposite sides of the end plates 81 and 82).

The side panel 80 surrounds the periphery (both sides in the direction B and both sides in the direction C) of the stacked body 3.

As shown in FIGS. 3 and 4, the end plates 81 and 82 interpose the stacked body 3 from both sides in the direction A. The external shape in the front view of the end plates 81 and 82 is formed in a rectangular shape larger than the unit cell 2. As shown in FIG. 3, the first end plate 81 is disposed on the first end side of the stacked body 3 in the direction A, in a state of interposing the first terminal plate 61 and the first insulator 66 between the first end plate 81 and the stacked body 3. The periphery of the first end plate 81 is surrounded by the side panel 80.

As shown in FIG. 1, the first end plate 81 is formed to have gas inlet holes (an oxidant gas inlet hole 85i and a fuel gas inlet hole 86i) and gas outlet holes (an oxidant gas outlet hole 85o and a fuel gas outlet hole 86o). The oxidant gas inlet hole 85i communicates with the oxidant gas inlet communication hole 41i through the oxidant gas inlet connection hole 72 formed in the first insulator 66. The fuel gas inlet hole 86i communicates with the fuel gas inlet communication hole 42i through the fuel gas inlet connection hole (not shown) formed in the first insulator 66. The oxidant gas outlet hole 85o communicates with the oxidant gas outlet communication hole 41o through the oxidant gas outlet connection hole (not shown) formed in the first insulator 66. The fuel gas outlet hole 86o communicates with the fuel gas outlet communication hole 42o through the fuel gas outlet connection hole (not shown) formed in the first insulator 66.

A plurality of gas manifolds 91i, 91o, 92i and 92o are connected to the first end plate 81. Each of the gas manifolds 91i, 91o, 92i and 92o is an oxidant gas inlet manifold 91i, an oxidant gas outlet manifold 91o, a fuel gas inlet manifold 92i and a fuel gas outlet manifold 92o. Each of the gas manifolds 91i, 91o, 92i and 92o is formed in a cylindrical shape that extends outside from the first end plate 81 in the direction A.

The oxidant gas inlet manifold 91i is disposed in the right upper corner portion of the first end plate 81. The oxidant gas inlet manifold 91i communicates with the oxidant gas inlet communication hole 41i (see FIG. 3) of the stacked body 3 through the oxidant gas inlet hole 85i and the oxidant gas inlet connection hole 72 (see FIG. 3). An oxidant gas inlet pipe (not shown) is connected to the oxidant gas inlet manifold 91i.

The oxidant gas outlet manifold 91o is disposed in the left lower corner portion of the first end plate 81. The oxidant gas outlet manifold 91o communicates with the oxidant gas outlet communication hole 41o (see FIG. 2) of the stacked body 3 through the oxidant gas outlet hole 85o of the first end plate 81 and the oxidant gas outlet connection hole of the first insulator 66. An oxidant gas outlet pipe (not shown) is connected to the oxidant gas outlet manifold 91o.

A fuel gas inlet manifold 92i is disposed in the right lower corner portion of the first end plate 81. The fuel gas inlet manifold 92i communicates with the fuel gas inlet communication hole 42i (see FIG. 2) of the stacked body 3 through the fuel gas inlet hole 86i of the first end plate 81 and the fuel gas inlet connection hole of the first insulator 66. A fuel gas inlet pipe (not shown) is connected to the fuel gas inlet manifold 92i.

The fuel gas outlet manifold 92o is disposed in the left upper corner portion of the first end plate 81. The fuel gas outlet manifold 92o communicates with the fuel gas outlet communication hole 42o (see FIG. 2) of the stacked body 3 through the fuel gas outlet hole 86o of the first end plate 81 and the fuel gas outlet connection hole of the first insulator 66. A fuel gas outlet pipe (not shown) is connected to the fuel gas outlet manifold 92o.

As shown in FIG. 4, the second end plate 82 is disposed on the second end side of the stacked body 3 in the direction A, while interposing the second terminal plate 62 and the second insulator 67 between the second end plate 82 and the stacked body 3. The periphery of the second end plate 82 is surrounded by the side panel 80 described above. Thus, the stacked body 3, the terminal plates 61 and 62, and the insulators 66 and 67 are entirely surrounded by the casing 4 (the end plates 81 and 82 and the four side panels 80).

Figure 5:
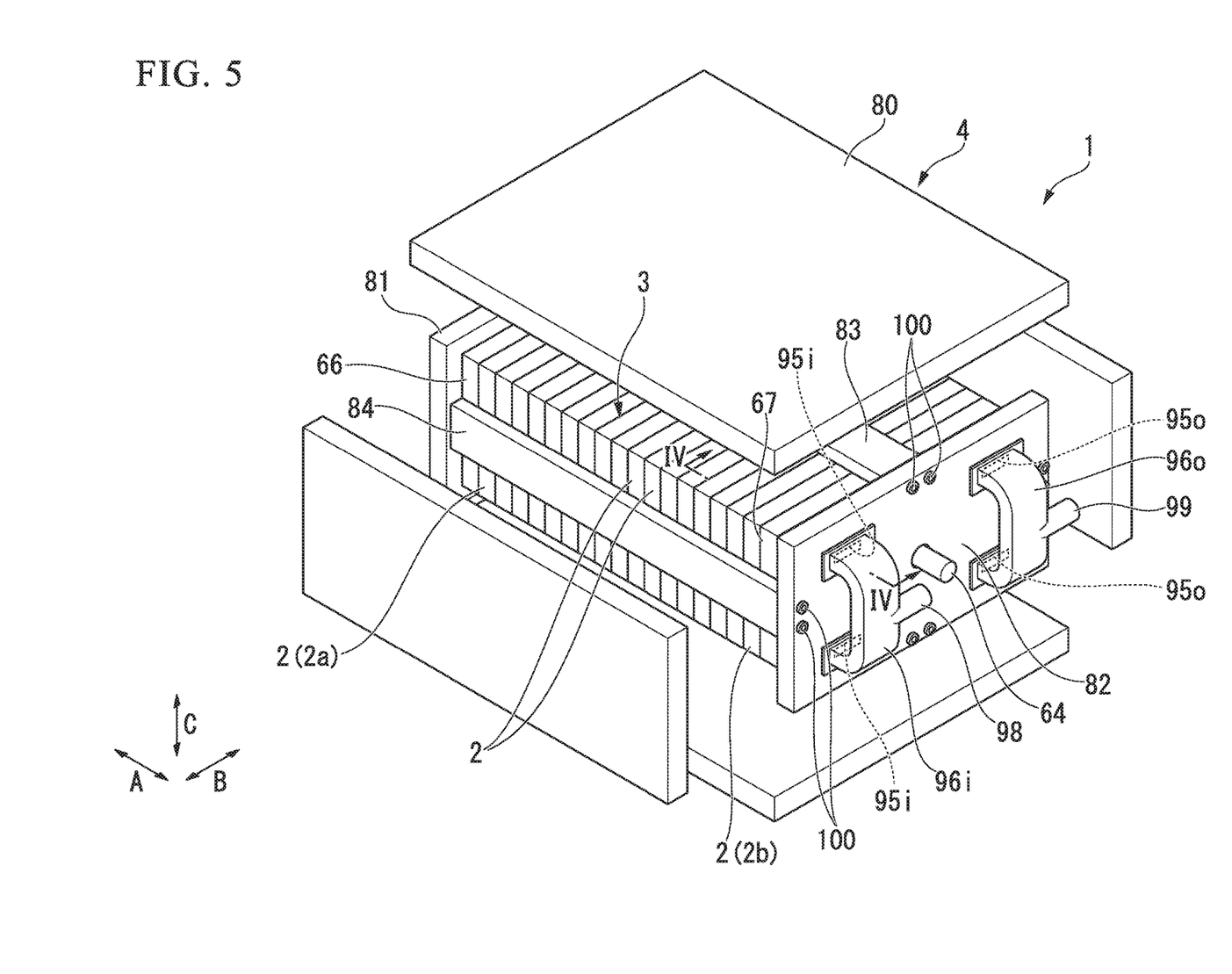
FIG. 5 is an exploded perspective view of the fuel cell stack of the first embodiment which is seen from a second end plate side.

FIG. 5 is an exploded perspective view of the fuel cell stack 1 that is seen from the second end plate 82 side.

As shown in FIG. 5, the second end plate 82 is formed to have a pair of coolant inlet holes 95i and a pair of the coolant outlet holes 95o. The coolant inlet holes 95i communicate with the coolant inlet communication holes 43i through the corresponding coolant inlet connection holes 74 (see FIG. 4) of the second insulator 67. The coolant outlet holes 95o communicate with the coolant outlet communication holes 43o through the corresponding coolant outlet connection holes of the second insulator 67.

A plurality of coolant manifolds (the coolant inlet manifold 96i and the coolant outlet manifold 96o) are connected to the second end plate 82. The coolant inlet manifold 96i is formed in an arch shape in a side view when viewed in the direction B. Openings of the coolant inlet manifold 96i on both sides in the direction C communicate with the corresponding coolant inlet holes 95i of the second end plate 82. Thus, the coolant inlet manifold 96i communicates with the coolant inlet communication holes 43i of the stacked body 3 through the coolant inlet holes 95i and the coolant inlet connection holes 74 (see FIG. 3). An inlet port 98 is provided to protrude from the central portion of the coolant inlet manifold 96i in the direction C. A coolant inlet pipe (not shown) is connected to the inlet port 98.

The coolant outlet manifold 96o is formed in an arch shape in a side view when viewed in the direction B. The openings of the coolant outlet manifold 96o on both sides in the direction C communicate with the corresponding coolant outlet holes 95o of the second end plate 82. Thus, the coolant outlet manifold 96o communicates with the coolant outlet communication holes 43o of the stacked body 3 through the coolant outlet holes 95o and a coolant outlet connection hole (not shown) of the second insulator 67. An outlet port 99 is provided to protrude from the central portion of the coolant outlet manifold 96o in the direction C. A coolant outlet pipe (not shown) is connected to the outlet port 99.

As shown in FIG. 1, the first coupling bar 83 and the second coupling bar 84 are formed in a plate shape that extends in the direction A. Each of the coupling bars 83 and 84 is fastened to the end plates 81 and 82 by a pair of fastening members 100, respectively, in a state in which both end surfaces in the direction A abut on the inner end surfaces of the respective end plates 81 and 82 in the direction A. Specifically, the first coupling bar 83 connects the long side portions of the respective end plates 81 and 82 on both sides of the stacked body 3 in the direction C. The second coupling bar 84 connects the short side portions of the respective end plates 81 and 82 on both sides of the stacked body 3 in the direction B. Three or more fastening members 100 may be provided for each of the coupling bars 83 and 84.

Next, the fastening structures between each of the end plates 81 and 82 and each of the coupling bars 83 and 84 will be described in detail. Both of the fastening structures between each of the end plates 81 and 82 and each of the coupling bars 83 and 84 have similar configurations. Therefore, in the following description, the fastening structure between the first end plate 81 and the first coupling bar 83 will be mainly described, and the description of the fastening structure of other parts will be omitted.

Figure 6:
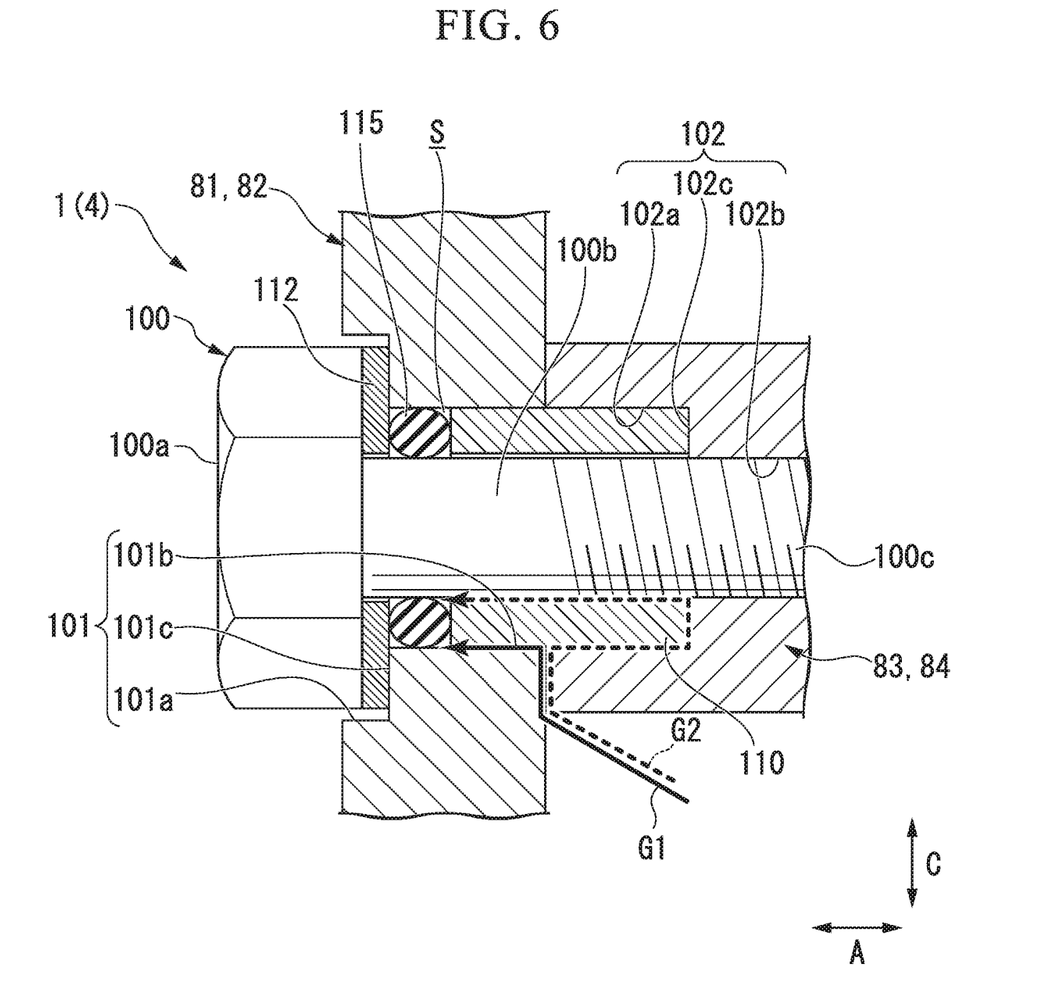
FIG. 6 is a cross-sectional view corresponding to line VI-VI of FIG. 1.

FIG. 6 is a cross-sectional view corresponding to line VI-VI of FIG. 1.

As shown in FIG. 6, an end plate side mounting hole 101 is formed in a portion of the first end plate 81 that overlaps the first coupling bar 83 when viewed in the direction A. The end plate side mounting hole 101 is a circular through-hole that penetrates the first end plate 81 in the direction A. The end plate side mounting hole 101 has a multistage shape with a smaller inner diameter at a position on the inside in the direction A. Specifically, the end plate side mounting hole 101 has an end plate side large-diameter portion 101a located on the outside in the direction A, and an end plate side small-diameter portion 101b connected to the inside of the end plate side large-diameter portion 101a in the direction A. The length of the end plate side large-diameter portion 101a in the direction A is shorter than the end plate side small-diameter portion 101b. In this embodiment, the two end plate side mounting holes 101 are formed at intervals in the direction B.

On the outer end surface of the first coupling bar 83 in the direction A, in a portion that overlaps the end plate side mounting hole 101 as viewed in the direction A, a coupling bar side mounting hole 102 is formed. The coupling bar side mounting hole 102 extends in the direction A, and opens on the outer end surface of the first coupling bar 83 in the direction A. The outer opening of the coupling bar side mounting hole 102 in the direction A communicates with the end plate side mounting hole 101.

The coupling bar side mounting hole 102 has a multistage shape with a smaller inner diameter at a position on the inside in the direction A. Specifically, the coupling bar side mounting holes 102 has a coupling bar side large-diameter portion 102a located on the outside in the direction A, and a coupling bar side small-diameter portion 102b connected to the inside of the coupling bar side large-diameter portion 102a in the direction A.

The inner diameter of the coupling bar side large-diameter portion 102a is equal to the inner diameter of the end plate side small-diameter portion 101b. In the example shown in FIG. 6, the inner circumferential surface of the coupling bar side large-diameter portion 102a, and the inner circumferential surface of the end plate side small-diameter portion 101b are disposed on the same plane.

In the coupling bar side mounting hole 102, at least the coupling bar side small-diameter portion 102b is a female screw hole.

A cylindrical knock 110 is inserted into each of the mounting holes 101 and 102. The cylindrical knock 110 performs positioning between the first end plate 81 and the first coupling bar 83, and receives a shear load that acts between the first end plate 81 and the first coupling bar 83. The cylindrical knock 110 is formed in a cylindrical shape extending in the direction A.

The length of the cylindrical knock 110 in the direction A is longer than the lengths of each of the end plate side small-diameter portion 101b and the coupling bar side large-diameter portion 102a in the direction A and is shorter than the total length of the end plate side small-diameter portion 101b and the coupling bar side large-diameter portion 102a in the direction A. The cylindrical knock 110 is disposed across the interior of the end plate side small-diameter portion 101b and the interior of the coupling bar side large-diameter portion 102a. In this embodiment, the inner end surface of the cylindrical knock 110 in the direction A abuts on a coupling bar side boundary surface 102c between the coupling bar side small-diameter portion 102b and coupling bar side large-diameter portion 102a from the outside in the direction A. Thus, the outer end surface of the cylindrical knock 110 in the direction A is located on the inside in the direction A of the end plate side boundary surface 101c between the end plate side large-diameter portion 101a and the end plate side small-diameter portion 101b.

The outer diameter of the cylindrical knock 110 is smaller than the inner diameters of the end plate side small-diameter portion 101b and the coupling bar side large-diameter portion 102a. The inner diameter of the cylindrical knock 110 is equal to or greater than the inner diameter of the coupling bar side small-diameter portion 102b.

The fastening member 100 is screwed into the coupling bar side mounting hole 102 through the end plate side mounting hole 101. Specifically, a head 100a of the fastening member 100 comes into contact with the end plate side boundary surface 101c from the outside in the direction A, while interposing the washer 112 therebetween. In this case, the washer 112 and the head 100 are partially housed in the end plate side large-diameter portion 101a. Accordingly, the amount of protrusion of the head 100a from the first end plate 81 to the outside in the direction A is suppressed. As the fastening member 100 of the present embodiment, for example, a hexagonal bolt is preferably used. However, the fastening member 100 is not limited to a hexagonal bolt, and may be a hexagonal socket head cap bolt. In this case, because it is possible to assemble the fastening member 100 using a wrench or the like, as compared to the case of assembling the fastening member using a screwdriver or the like, it is possible to reduce the space required at the time of assembling.

A shaft portion 100b of the fastening member 100 has an outer diameter that is smaller than an inner diameter of the cylindrical knock 110. The shaft portion 100b extends through the cylindrical knock 110 within the mounting holes 101 and 102. A distal end portion of the shaft portion 100*b* is screwed into the coupling bar side small-diameter portion 102*b*.

A seal member (a first seal member) 115 is disposed in a portion (hereinafter, referred to as a sealing space S) surrounded by the washer 112 and the cylindrical knock 110 inside the end plate side mounting hole 101. The seal member 115 is formed of an elastically deformable material. The seal member 115 is formed in an annular shape in which the direction A is set as an axial direction. The seal member 115 is externally fitted to the shaft portion 100*b* of the fastening member 100 in the seal space S. In the shown example, a vertical section of the seal member 115 extending in the direction A is formed in a circular shape, but may be formed in a rectangular shape or the like, without being limited thereto.

In this embodiment, an interference is provided between the seal member 115 and the shaft portion 100*b*. Accordingly, the seal member 115 is in close contact with the outer circumferential surface of the shaft portion 100*b* and the inner circumferential surface of the end plate side small-diameter portion 101*b*, at least in the state of being compressed in the radial direction (a direction perpendicular to the direction A). The seal member 115 may be disposed in the seal space S, while being deformed in the axial direction (direction A). The seal member 115 may come into close contact with the washer 112 or the cylindrical knock 110 in the direction A.

<Operation>

Next, the operation of the aforementioned fuel cell stack 1 will be described.

As shown in FIG. 1, the oxidant gas pumped from a compressor (not shown) and having high temperature (e.g., of substantially the same level as the operating temperature of the fuel cell stack 1) is supplied to the fuel cell stack 1 of the present embodiment through the oxidant gas inlet manifold 91*i*. The fuel gas sent from a hydrogen tank (not shown) is supplied to the fuel cell stack 1 through the fuel gas inlet manifold 92*i*.

The oxidant gas flowing into the oxidant gas inlet manifold 91*i* is supplied to the stacked body 3 through the oxidant gas inlet hole 85*i* and the oxidant gas inlet connection hole 72 (see FIG. 3). As shown in FIG. 3, the oxidant gas supplied to the stacked body 3 flows through the oxidant gas inlet communication holes 41*i* of the respective unit cells 2 in the direction toward the second end plate 82 in the direction A. As shown in FIG. 2, the oxidant gas flowing through the oxidant gas inlet communication holes 41*i* is supplied to the cathode electrode 33 of the MEA 23, by being introduced into the oxidant gas flow passage 46.

On the other hand, as shown in FIG. 1, the fuel gas flowing into the fuel gas inlet manifold 92*i* is supplied into the stacked body 3 through the fuel gas inlet hole 86*i* of the first end plate 81 and the fuel gas inlet connection hole of the first insulator 66. The fuel gas supplied into the stacked body 3 flows through the fuel gas inlet communication holes 42*i* of the respective unit cells 2 in the direction toward the second end plate 82 in the direction A. As shown in FIG. 2, the fuel gas flowing through the fuel gas inlet communication hole 42*i* is supplied to the anode electrode 32 of the MEA 23 by being introduced into the fuel gas flow passage 45.

As a result, the hydrogen ions generated by the catalytic reaction in the anode electrode 32 are transmitted through the solid polymer electrolyte membrane 31 and move to the cathode electrode 33, and the hydrogen ions cause an electrochemical reaction with the oxidant gas in the cathode electrode 33 to generate power.

Thereafter, the consumed oxidant gas provided for the power generation in the cathode electrode 33 flows into the oxidant gas outlet communication hole 41*o*. The consumed oxidant gas flowing into the oxidant gas outlet communication hole 41*o* flows through the oxidant gas outlet communication hole 41*o* in the direction toward the first end plate 81 in the direction A. As shown in FIG. 1, the consumed oxidant gas is discharged to the oxidant gas outlet manifold 91*o* through the oxidant gas outlet connection hole of the first insulator 66 and the oxidant gas outlet hole 85*o* of the first end plate 81. The oxidant gas discharged to the oxidant gas outlet manifold 91*o* is discharged to the outside of the vehicle through an oxidant gas outlet pipe (not shown).

On the other hand, as shown in FIG. 2, the consumed fuel gas provided for the power generation in the anode electrode 32 flows into the fuel gas outlet communication hole 42*o*. The consumed fuel gas flowing into the fuel gas outlet communication hole 42*o* flows through the fuel gas outlet communication hole 42*o* in the direction toward the first end plate 81 in the direction A. Thereafter, as shown in FIG. 1, the consumed fuel gas is discharged to the fuel gas outlet manifold 92*o* through the fuel gas outlet connection hole of the first insulator 66 and the fuel gas outlet hole 86*o* of the first end plate 81, and is supplied to the fuel gas inlet manifold 92*i* again. Some of the fuel gas discharged to the fuel gas outlet manifold 92*o* is discharged to the outside of the vehicle, after being diluted by mixing with the consumed oxidant gas in a diluter (not shown).

By operating a water pump (not shown), a coolant circulates among the stacked body 3, the driving motor, the radiator and the like. Specifically, the coolant sent from the water pump flows into the coolant inlet communication hole 43*i* of the stacked body 3 through the coolant inlet manifold 96*i* shown in FIG. 5, the coolant inlet hole 95*i* and the coolant inlet connection hole 74 (see FIG. 3). As shown in FIG. 2, the coolant flowing into the coolant inlet communication hole 43*i* flows through the coolant inlet communication hole 43*i* in the direction toward the first end plate 81 in the direction A. When the coolant flowing through the coolant inlet communication hole 43*i* is supplied to the coolant flow passage 55, heat is exchanged between the respective unit cells 2 and coolant. Thereafter, the coolant flows into the coolant outlet communication hole 43*o*, and flows through the coolant outlet communication hole 43*o* in the direction toward the second end plate 82 in the direction A. As shown in FIG. 5, the coolant is discharged to the coolant outlet manifold 96*o* through the coolant outlet connection hole of the second insulator 67 and the coolant outlet hole 95*o* of the second end plate 82. The coolant discharged to the coolant outlet manifold 96*o* is supplied to the stacked body 3 again, after flowing through the radiator, the driving motor or the like through the outlet port 99 and the coolant outlet pipe.

The present embodiment has a configuration in which the seal member 115 coming into close contact with the end plate side small-diameter portion 101*b* and the shaft portion 100*b* of the fastening member 100 is interposed in the seal space S surrounded by the washer 112 and the cylindrical knock 110, within the end plate side mounting hole 101.

According to this configuration, it is possible for the reaction gas (in particular, fuel gas) leaking from the stacked body 3 and present in the casing 4 to be suppressed from being discharged to the outside of the fuel cell stack 1 (the casing 4) through the respective mounting holes 101 and 102.

As shown in FIG. 6, in some cases, the reaction gas, which has entered the mounting holes 101 and 102 through the gap between the first end plate 81 and the first coupling bar 83 flows toward the outside in the direction A through the outer circumferential side of the cylindrical knock 110 (an arrow G1 in FIG. 6). In this case, the reaction gas flowing through the outer circumferential side of the cylindrical knock 110 is blocked from flowing to the outside in the direction A by the seal member 115.

In some cases, the reaction gas, which has entered the mounting holes 101 and 102, goes around the cylindrical knock 110 from the inside in the direction A, enters the inner circumferential side of the cylindrical knock 110, and flows toward the outside in the direction A through the inner circumferential side of the cylindrical knock 110 (an arrow G2 in FIG. 6). In this case, the reaction gas flowing through the inner circumferential side of the cylindrical knock 110 is also blocked from flowing to the outside in the direction A by the seal member 115. Thus, it is possible to ensure the sealing properties between the mounting holes 101 and 102 and the fastening member 100, and the seal member 115 can suppress the reaction gas from being discharged to the outside of the casing 4 through the mounting holes 101 and 102.

In particular, in this embodiment, a single seal member 115 can block the reaction gas that flows through the outer circumferential side and the inner circumferential side of the cylindrical knock 110. Accordingly, it is possible to promote simplification and to reliably prevent the reaction gas from leaking out of the fuel cell stack 1.

The seal member 115 can block water present outside the casing 4 from entering the casing 4 through the end plate side mounting holes 101. In this case, because it is possible to block water on the outside in the direction A of the boundary portion between the first end plate 81 and the first coupling bar 83, in particular, it is possible to reduce corrosion of a portion (hereinafter, referred to as shear portion) of the cylindrical knock 110 corresponding to the boundary portion between the first end plate 81 and the first the coupling bar 83.

Each of the fastening structure between the first end plate 81 and the second coupling bar 84, the fastening structure between the second end plate 82 and the first coupling bar 83, and the fastening structure between the second end plate 82 and the second coupling bar 84 exhibit the operational effects similar to the aforementioned embodiments.

Modified Example

Figure 7:
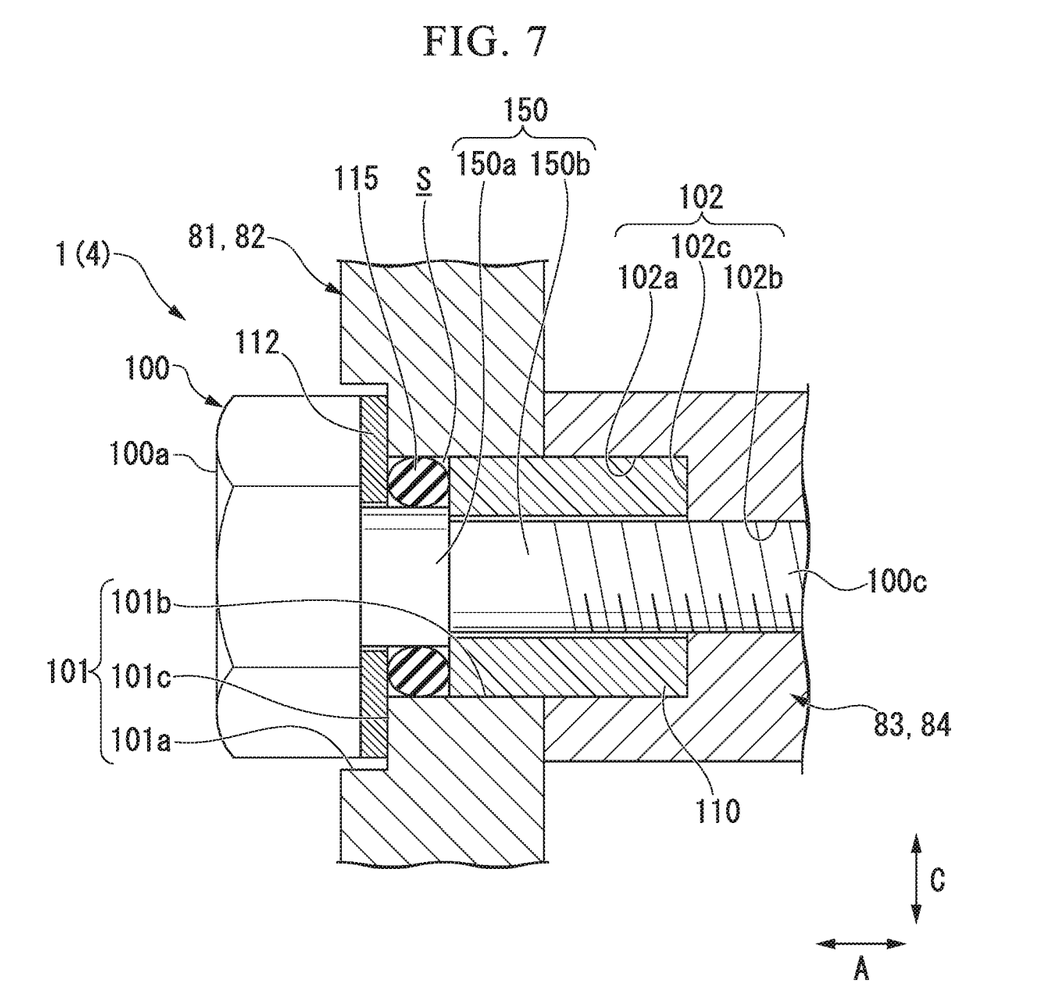
FIG. 7 is a cross-sectional view corresponding to FIG. 6 according to a modified example of the first embodiment.

Next, a modified example of the first embodiment will be described. FIG. 7 is a cross-sectional view corresponding to FIG. 6 according to the modified example of the first embodiment. The present modified example is different from the aforementioned first embodiment in that a shaft portion 150 of the fastening member 100 is formed in a stepped shape.

As shown in FIG. 7, the shaft portion 150 of the fastening member 100 has a large-diameter shaft portion 150a located on the outside in the direction A, and a small-diameter shaft portion 150b connected to the inside of the large-diameter shaft portion 150a in the direction A.

The large-diameter shaft portion 150a is disposed on the end plate side large-diameter portion 101a and the end plate side small-diameter portion 101b across the axial direction (direction A). The seal member 115 is externally fitted to the large-diameter shaft portion 150a. The outer diameter of the large-diameter shaft portion 150a is larger than the inner diameter of the seal member 115, and is smaller than the inner diameter of the end plate side small-diameter portion 101b. That is, interference is provided between the large-diameter shaft portion 150a and the seal member 115. Thus, the seal member 115 is in close contact with the end plate side small-diameter portion 101b and the small-diameter shaft portion 150b, while being deformed in the radial direction. A washer 112 is externally fitted to the large-diameter shaft portion 150a within the end plate side large-diameter portion 101a.

The small-diameter shaft portion 150b has an outer diameter that is smaller than the inner diameters of each of the cylindrical knock 110 and the seal member 115. The small-diameter shaft portion 150b is disposed across the end plate side small-diameter portion 101b and the coupling bar side mounting hole 102. Specifically, the small-diameter shaft portion 150b extends through the cylindrical knock 110 within the mounting holes 101 and 102. A distal end portion of the small-diameter shaft portion 150b is screwed into the coupling bar side small-diameter portion 102b.

According to this configuration, by forming the shaft portion 150 of the fastening member 100 in a stepped shape, when assembling the fastening member 100, it is possible to suppress the interference between the seal member 115 and the small-diameter shaft portion 150b. Thus, since the torsion or the like of the seal member 115 can be suppressed when assembling the fastening member 100, it is possible to minimize damage to the seal member 115 caused by the screw portion 100c. Therefore, the sealing properties can be ensured over a long period of time.

Second Embodiment

Figure 8:
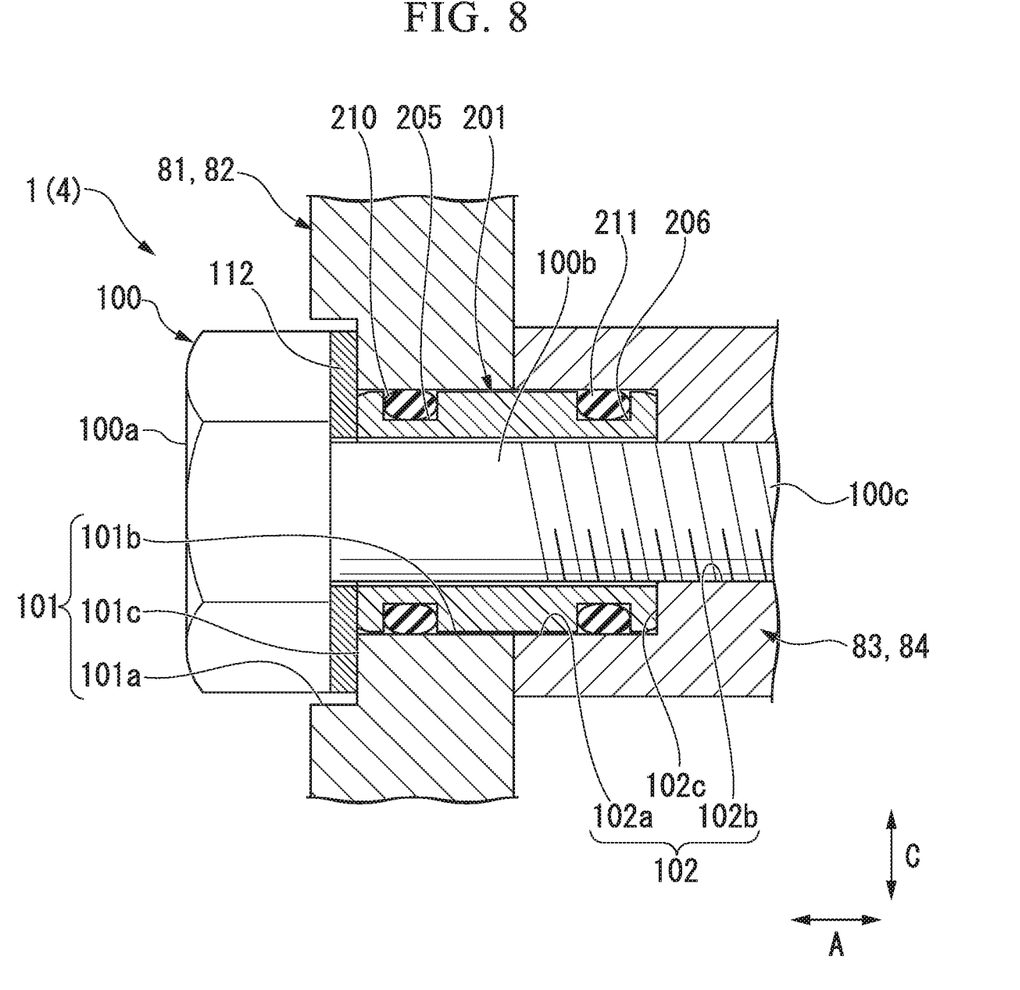
FIG. 8 is a cross-sectional view corresponding to FIG. 6 in the second embodiment.

Next, a second embodiment of the present invention will be described. FIG. 8 is a cross-sectional view corresponding to FIG. 6 of the second embodiment. The present embodiment differs from the aforementioned first embodiment in that two seal members 210 and 211 are used. In the following description, the configurations similar to those of the aforementioned first embodiment will be denoted by the same reference numerals, and a description thereof will not be provided.

In the fuel cell stack 200 shown in FIG. 8, the length of the cylindrical knock 201 in the direction A is equal to the total length of the end plate side small-diameter portion 101b and the coupling bar side large-diameter portion 102a in the direction A. Therefore, the inner end surface of the cylindrical knock 201 in the direction A abuts on the coupling bar side boundary surface 102c from the outside in the direction A. On the other hand, the outer end surface of the cylindrical knock 201 in the direction A is disposed at the same position as the end plate side boundary surface 101c in the direction A. As long as the length of the cylindrical knock 201 in the direction A is equal to or less than the total length of the end plate side small-diameter portion 101b and the coupling bar side large-diameter portion 102a in the direction A, it can be appropriately changed.

Two housing grooves 205 and 206 are formed on the outer circumferential surface of the cylindrical knock 201 at intervals in the direction A. Each of the housing grooves 205 and 206 is recessed to the inside of the cylindrical knock 201 in the radial direction, and is formed over the entire circumference of the cylindrical knock 201.

Among the respective housing grooves 205 and 206, the outer housing groove 205 located on the outside in the direction A is formed in a portion of the cylindrical knock 201 located in the end plate side small-diameter portion 101b. On the other hand, among the respective housing grooves 205 and 206, the inner housing groove 206 located on the inside in the direction A is formed in a portion of the cylindrical knock 201 located in the coupling bar side large-diameter portion 102a.

Each of the seal members 210 and 211 is housed inside the respective housing grooves 205 and 206. Each of the seal members 210 and 211 is housed inside the respective housing grooves 205 and 206, while being deformed in the radial direction. In this case, among the seal members 210 and 211, the outer seal member (second seal member) 210 which is located on the outside in the direction A is housed inside the outer housing groove 205. The outer seal member 210 is in close contact with the inner surface of the outer housing groove 205 and the inner circumferential surface of the end plate side small-diameter portion 101b. On the other hand, among the seal members 210 and 211, the inner seal member (third seal member) 211 located on the inside in the direction A is housed inside the inner housing groove 206. The inner seal member 211 is in close contact with the inner surface of the inner housing groove 206 and the inner circumferential surface of the coupling bar side large-diameter portion 102a.

The present embodiment is configured to include the outer seal member 210 which is in close contact with the inner surface of the outer housing groove 205 and the inner circumferential surface of the end plate side small-diameter portion 101b as described above. Therefore, the outer seal member 210 can suppress the reaction gas which has entered the mounting holes 101 and 102 from flowing to the outside in the direction A through the outer circumferential side of the cylindrical knock 201.

The present embodiment is configured to have the inner seal member 211 which is in close contact with the inner surface of the inner housing groove 206 and the inner circumferential surface of the coupling bar side large-diameter portion 102a as described above. Therefore, the inner seal member 211 can suppress the reaction gas which has entered the mounting holes 101 and 102 from going around the inside of the cylindrical knock 201 in the direction A and entering the inner circumferential side of the cylindrical knock 201.

Thus, it is possible to ensure the sealing properties between the mounting holes 101 and 102 and the fastening member 100, and the seal members 210 and 211 can suppress the reaction gas from being discharged from the mounting holes 101 and 102 to the outside of the casing 4.

The outer seal member 210 can block water present outside the casing 4 from entering the casing 4 through the end plate side mounting hole 101. In this case, because it is possible to block water on the outside in the direction A than the boundary portion between the first end plate 81 and the first coupling bar 83, in particular, it is possible to suppress the corrosion of the shear portion of the cylindrical knock 201.

In the aforementioned embodiments, although the description has been given of a case of using one or two seal members, three or more seal members may be used.

The aforementioned embodiments describe the configuration in which the head 100a of the fastening member 100 is housed in the end plate side large-diameter portion 101a, but there is no limitation thereto. That is, a configuration in which the head 100a of the fastening member 100 abuts against the outer end surfaces of the end plates 81 and 82 in the direction A may be adopted.

The aforementioned embodiments describe the configuration in which the mounting holes 101 and 102 are formed in a multistage shape, but are not limited thereto and may be formed to have a uniform inner diameter throughout the mounting holes.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell stack comprising:
a fuel cell stacked body in which a plurality of fuel cells are stacked in a first direction;
a casing that houses the fuel cell stacked body;
a pair of end plates that constitute a part of the casing and are disposed on opposing sides of the fuel cell stacked body in the first direction;
a coupling bar that bridges between the pair of end plates;
a fastening member that connects an end plate of the pair of end plates and the coupling bar in the first direction;
a cylindrical knock that is disposed inside both an end plate side mounting hole and a coupling bar side mounting hole to which the fastening member is inserted in the first direction, and is externally fitted to the fastening member inside the end plate side mounting hole and the coupling bar side mounting hole, the cylindrical knock being longer in the first direction than a length of the coupling bar side mounting hole;
a second seal member that is externally fitted to the cylindrical knock inside the end plate side mounting hole, and is in close contact with the inner circumferential surface of the end plate side mounting hole and the cylindrical knock; and
a third seal member that is externally fitted to the cylindrical knock inside the bar side mounting hole, and is in close contact with the inner circumferential surface of the coupling bar side mounting hole and the cylindrical knock,
wherein the second seal and third seal members are spaced apart in the first direction and a boundary portion between the end plate and the coupling bar is located between the second seal member and the third seal member in the first direction,
wherein first and second housing grooves for the corresponding second and third seal members are respectively provided on an outer circumferential surface of the cylindrical knock,
wherein the first housing groove and the second housing groove are spaced apart in the first direction,
wherein a region of the outer circumferential surface of the cylindrical knock between the first housing groove and the second housing groove in the first direction is located at the boundary portion between the end plate and the coupling bar,
wherein the second seal member is configured to block a release of a reaction gas from the boundary portion along the outer circumferential surface of the cylindrical knock to an outside of the end plate,
wherein the third seal member is configured to block the release of the reaction gas from the boundary portion along an inner circumferential surface of the cylindrical knock to the outside of the end plate,
wherein an outer circumferential surface of the fastening member is in continuous surface abutment with the inner circumferential surface of the cylindrical knock along the entire inner circumferential surface of the cylindrical knock, wherein the end plate side mounting hole has an end plate side large-diameter portion located on the outside in the first direction, and an end plate side small-diameter portion connected to the inside of the end plate side large-diameter portion in the first direction, the coupling bar side mounting holes has a coupling bar side large-diameter portion located on the outside in the first direction, and a coupling bar side small-diameter portion connected to the inside of the coupling bar side large-diameter portion in the first direction, and the length of the cylindrical knock in the first direction is equal to the total length of the end plate side small-diameter portion and the coupling bar side large-diameter portion in the first direction.

2. The fuel cell stack according to claim 1, wherein the fastening member is fixed to the coupling bar by being screwed into the coupling bar.

3. The fuel cell stack according to claim 1, wherein said coupling bar comprises a screw part; and wherein the cylindrical knock is disposed between a washer for the fastening member and the screw part of the coupling bar in the first direction.

4. The fuel cell stack according to claim 1, wherein the coupling bar side mounting hole has an inner diameter that is equal to an inner diameter of the end plate side mounting hole.

* * * * *